(12) United States Patent
Lin et al.

(10) Patent No.: US 11,126,125 B1
(45) Date of Patent: Sep. 21, 2021

(54) IMAGE FORMING APPARATUS

(71) Applicant: KYOCERA Document Solutions Inc., Osaka (JP)

(72) Inventors: Lu Lin, Osaka (JP); Atsushi Ishizaki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 45 days.

(21) Appl. No.: 16/759,530

(22) PCT Filed: Aug. 27, 2019

(86) PCT No.: PCT/JP2019/033497
§ 371 (c)(1),
(2) Date: Apr. 27, 2020

(87) PCT Pub. No.: WO2020/084892
PCT Pub. Date: Apr. 30, 2020

(30) Foreign Application Priority Data

Oct. 24, 2018 (JP) .............................. JP2018-199794

(51) Int. Cl.
*G03G 15/00* (2006.01)

(52) U.S. Cl.
CPC ......... *G03G 15/55* (2013.01); *G03G 15/5016* (2013.01); *G03G 15/5062* (2013.01); *G03G 2215/00042* (2013.01)

(58) Field of Classification Search
CPC ....... G03G 15/55–556; G03G 15/5016; G03G 15/5062
See application file for complete search history.

(56) References Cited

U.S. PATENT DOCUMENTS

| 5,296,896 A | * | 3/1994 | Nishiyama ............. | G03G 15/01 399/139 |
| 5,729,350 A | * | 3/1998 | Ozaki .................. | G03G 15/507 358/296 |
| 6,031,621 A | * | 2/2000 | Binder ............... | G03G 15/5079 235/383 |

(Continued)

FOREIGN PATENT DOCUMENTS

| JP | 2003067166 A | 3/2003 |
| JP | 2007059975 A | 3/2007 |

(Continued)

*Primary Examiner* — Carla J Therrien
(74) *Attorney, Agent, or Firm* — Alleman Hall Creasman & Tuttle LLP

(57) ABSTRACT

It is an object of the present invention to diagnose image quality of a print image without using an open communication network and output the print image, a diagnosis result of image quality, and information of the print parameters while avoiding disclosure of confidential information to users. A test print control portion causes a print device to execute a test print process to form a test image on a sheet. An image quality diagnosis portion diagnoses image quality of the test image included in the image read by an image reading device. A code image generating portion generates a code image that represents information of print parameters adopted in the test print process. An output control portion causes an output device to output a diagnosis image that includes an image representing a diagnosis result of image quality of the test image, and the code image.

7 Claims, 4 Drawing Sheets

(56) References Cited

U.S. PATENT DOCUMENTS

| | | | |
|---|---|---|---|
| 6,985,682 B2* | 1/2006 | Haines | G03G 15/5029 |
| | | | 399/82 |
| 2008/0050133 A1 | 2/2008 | Adiletta | |
| 2008/0144093 A1 | 6/2008 | Zaima | |
| 2009/0316215 A1 | 12/2009 | Kita | |
| 2011/0095079 A1* | 4/2011 | Tse | H04N 1/0097 |
| | | | 235/375 |
| 2018/0239290 A1* | 8/2018 | Tomii | G03G 15/55 |
| 2020/0409612 A1* | 12/2020 | Crooks | H04N 1/00031 |

FOREIGN PATENT DOCUMENTS

| | | |
|---|---|---|
| JP | 2008152395 A | 7/2008 |
| JP | 20104311 A | 1/2010 |
| JP | 2018132682 A | 8/2018 |
| JP | 2018141898 A | 9/2018 |

* cited by examiner

IMAGE FORMING APPARATUS

TECHNICAL FIELD

The present invention relates to an image forming apparatus having a function to diagnose a print image quality.

BACKGROUND ART

An image forming apparatus such as a copier, a facsimile apparatus, or a multifunction peripheral includes a print device and an image reading device, wherein the print device forms an image on a sheet, and the image reading device reads an image from a document sheet.

There is known a copier that diagnoses a failure of the copier itself, and transmits, via an e-mail, data representing a diagnosis result to a host computer (see, for example, PTL1).

CITATION LIST

Patent Literature

[PTL 1] Japanese Patent Application Publication No. 2003-67166

SUMMARY OF THE INVENTION

Problems to be Solved by the Invention

Meanwhile, the image forming apparatus may have an image quality diagnosis function to diagnose image quality of a print image and output a diagnosis result. The image quality diagnosis function contributes to appropriately correcting print parameters, and furthermore to appropriately maintaining the print quality.

For example, it is often the case that a worker such as a repair person of the image forming apparatus can quickly and appropriately adjust print parameters by consulting a print image and information of the print parameters at the time of an image quality degradation when a diagnosis result showing the image quality degradation is obtained.

Accordingly, if the image forming apparatus has a function to transmit a diagnosis result of image quality, and a print image and information of the print parameters at the time of the diagnosis result, to a management apparatus or the like to which the worker is accessible, the workability of the worker is improved.

However, the image forming apparatus may not be connected to an open communication network such as the Internet or a public line. In that case, the image forming apparatus cannot transmit information of the print parameters or the like to the management apparatus or the like.

On the other hand, information of the print parameters concerning developing bias or transfer bias is confidential information for the maker of the image forming apparatus. It is desirable that such confidential information is not easily known to the user.

The present invention has been made in view of such conventional circumstances, and it is an object of the present invention to provide an image forming apparatus that can diagnose image quality of the print image without using an open communication network and output the print image, a diagnosis result of image quality, and information of the print parameters while avoiding disclosure of confidential information to users.

Solution to the Problems

An image forming apparatus according to an aspect of the present invention includes a print device, an image reading device, a test print control portion, an image quality diagnosis portion, a code image generating portion, and an output control portion. The print device forms an image on a sheet. The image reading device reads an image from a document sheet. The test print control portion causes the print device to execute a test print process to form a predetermined test image on a sheet. The image quality diagnosis portion diagnoses image quality of the test image included in the image read by the image reading device. The code image generating portion generates a code image that represents information of print parameters adopted in the test print process. The output control portion causes an output device to output a diagnosis image that includes an image representing a diagnosis result of image quality of the test image, and the code image.

Advantageous Effects of the Invention

According to the present invention, it is possible to provide an image forming apparatus that can diagnose image quality of the print image without using an open communication network and output the print image, a diagnosis result of image quality, and information of the print parameters while avoiding disclosure of confidential information to users.

DESCRIPTION OF EMBODIMENTS

Figure 1:
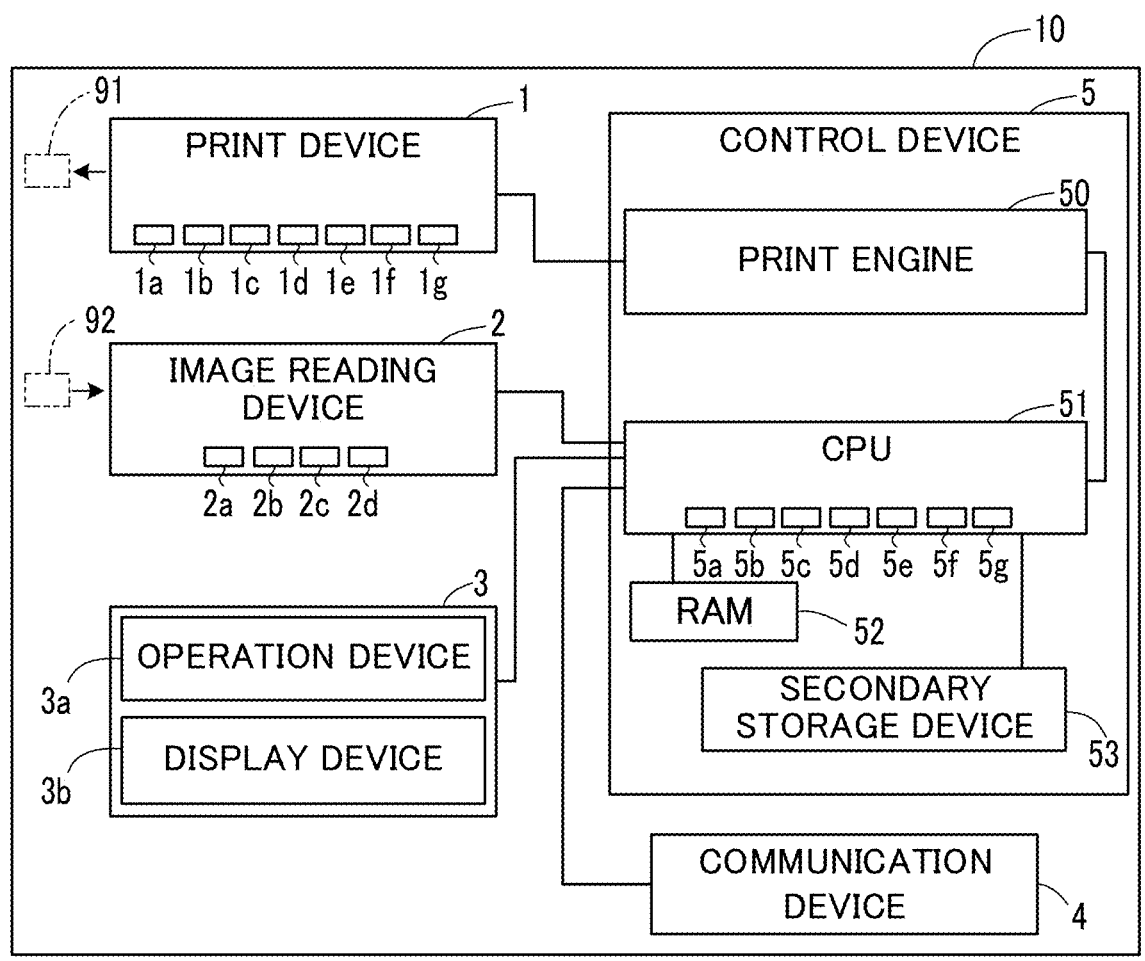
FIG. 1 is a block diagram showing a configuration of an image forming apparatus according to an embodiment of the present invention.

The following describes an embodiment of the present invention with reference to the accompanying drawings. It should be noted that the following embodiment is an example of a specific embodiment of the present invention and should not limit the technical scope of the present invention.

[Configuration of Image Forming Apparatus 10]

An image forming apparatus 10 according to the embodiment of the present invention includes a print device 1 and an image reading device 2. For example, the image forming apparatus 10 is a copier or a multifunction peripheral.

The print device 1 is configured to execute a print process to form an image on a sheet 91. The image reading device 2 executes an image reading process to read an image from a document sheet 92.

In the following description, the image formed by the print device 1 on the sheet 91 during the print process is referred to as a print image. In addition, the image read from the document sheet 92 by the image reading device 2 during the image reading process is referred to as a read image.

The image forming apparatus 10 is configured to communicate with a host apparatus (not shown) via a network such as a LAN (Local Area Network). The host apparatus is a computer that can communicate with the image forming apparatus 10.

As shown in FIG. 1, the image forming apparatus 10 includes, in addition to the print device 1 and the image reading device 2, a user interface device 3, a communication device 4, and a control device 5.

The control device 5 includes a print engine 50, a CPU 51, a RAM (Random Access Memory) 52, and a secondary storage device 53.

The user interface device 3 includes an operation device 3a and a display device 3b. The operation device 3a is a device for receiving user operations and includes, for example, operation buttons and a touch panel. The display device 3b includes a display panel such as a liquid crystal panel that can display information such as images.

The communication device 4 is a communication interface device configured to perform a communication with the host apparatus via a network. The control device 5 performs all of data transmissions to and receptions from the host apparatus, via the communication device 4.

The print device 1 is configured to execute a print job by a predetermined method such as an electrophotographic method or an inkjet method. In the present embodiment, the print device 1 executes the print process based on the data of the read image or a print request that is received from the host apparatus via the communication device 4.

In the present embodiment, the print device 1 executes the print process by the electrophotographic method. In this case, the print device 1 includes a sheet conveyance mechanism 1a, a photoconductor 1b, a charging device 1c, a laser scanning unit 1d, a developing device 1e, a transfer device 1f, and a fixing device 1g.

The sheet conveyance mechanism 1a conveys the sheet 91 along a predetermined path. The charging device 1c charges the surface of the photoconductor 1b. The laser scanning unit 1d writes an electrostatic latent image on the charged surface of the photoconductor 1b.

The developing device 1e develops the electrostatic latent image on the photoconductor 1b into a toner image. The transfer device if transfers the toner image on the photoconductor 1b to the sheet 91. The toner is an example of developer.

In a case where the print device 1 is configured to form a color image on the sheet 91, the print device 1 includes a plurality of image creation devices (not shown) that generate toner images of different colors. Each of the image creation devices includes the photoconductor 1b, the charging device 1c, and the developing device 1e.

Furthermore, the transfer device if includes: an intermediate transfer belt that is an endless belt; a plurality of primary transfer devices corresponding to a plurality of photoconductors 1b; and a secondary transfer device. The plurality of primary transfer devices form a color toner image on the intermediate transfer belt by transferring the toner images from the plurality of photoconductors 1b to the surface of the intermediate transfer belt. It is noted that the plurality of primary transfer devices may transfer toner images of a single color from the photoconductors 1b to the intermediate transfer belt.

The secondary transfer device transfers the single-color toner image or the color toner image from the intermediate transfer belt to the sheet 91. The fixing device 1g heats the single-color toner image or the color toner image on the sheet 91 in order to fix the image to the sheet 91.

The image reading device 2 includes a light source 2a, a scan mechanism 2b, an image sensor 2c, and an AFE (Analog Front End) 2d.

The light source 2a emits light toward the document sheet 92. The scan mechanism 2b causes the light from the light source 2a to scan the document sheet 92. The image sensor 2c receives reflection light from the document sheet 92, and outputs a signal representing a detected amount of received light, as an image signal. The AFE 2d converts the analog image signal into digital image data.

The control device 5 is configured to perform various calculations, data processing, and control of various electric devices included in the image forming apparatus 10. The control device 5 is configured to transmit and receive data and control signals to/from the print device 1, the image reading device 2, the user interface unit 3, and the communication device 4.

The print engine 50 causes the print device 1 to execute the print process by controlling the print device 1 in accordance with a command from the CPU 51. It is noted that the print engine 50 is an example of a print control portion.

The print engine 50 is implemented by a processor, such as an MPU (Micro Processing Unit) or a DSP (Digital Signal Processor), or a circuit such as an ASIC (Application Specific Integrated Circuit) that are not shown.

The secondary storage device 53 is a computer-readable nonvolatile storage device. The secondary storage device 53 is configured to store computer programs and various types of data. For example, either or both of a hard disk drive and a SSD (Solid State Drive) may be adopted as the secondary storage device 53.

The RAM 52 is a computer-readable volatile storage device. The RAM 52 primarily stores: the computer programs executed by the CPU 51; and data that is output or consulted by the CPU 51 during execution of the computer programs.

The CPU 51 is a processor configured to execute various types of data processing and perform control by executing the computer programs stored in the secondary storage device 53. It is noted that another processor, such as the DSP, may execute the data processing and perform the control in place of the CPU 51.

The CPU 51 operates as a main control portion 5a, a print control portion 5b, and a reading control portion 5c when it executes the computer programs.

The main control portion 5a mainly monitors operations performed on the operation device 3a and data received by the communication device 4, and controls starting a process in accordance with a detected operation or received data.

Furthermore, the main control portion 5a controls the display device 3b and displays various types of notification screens and operation screens on the display device 3b.

The print control portion 5b supplies, to the print engine 50, target data of the print process specified by the print request, or data of the read image, and, via the print engine 50, causes the print device 1 to execute the print process.

The reading control portion 5c controls the image reading device 2 to execute the image reading process.

Meanwhile, as described below, the image forming apparatus 10 has an image quality diagnosis function to diagnose image quality of a print image and output a diagnosis result. The image quality diagnosis function contributes to appropriately correcting print parameters adopted in the print process, and to appropriately maintaining the print quality.

For example, it is often the case that a worker such as a repair person of the image forming apparatus 10 can quickly and appropriately adjust the print parameters by consulting a print image and information of the print parameters at the time of an image quality degradation when a diagnosis result showing the image quality degradation is obtained.

Accordingly, if the image forming apparatus 10 has a function to transmit a diagnosis result of image quality, and a print image and information of the print parameters at the time of the diagnosis result, to a management apparatus or the like to which the worker is accessible, the workability of the worker is improved.

However, the image forming apparatus 10 may not be connected to an open communication network such as the Internet or a public line. In that case, the image forming apparatus 10 cannot transmit information of the print parameters or the like to the management apparatus or the like.

On the other hand, information of the print parameters concerning developing bias or transfer bias is confidential information for the maker of the image forming apparatus 10. It is desirable that such confidential information is not easily known to the user.

In the present embodiment, the image forming apparatus 10 executes an image quality management process that is described below. This allows the image forming apparatus 10 to diagnose image quality of the print image without using an open communication network and output the print image, a diagnosis result of image quality, and information of the print parameters while avoiding disclosure of confidential information to users.

By executing the computer programs, the CPU 51 further operates as an image quality diagnosis portion 5d, an encryption portion 5e, a code image generating portion 5f, and a parameter correcting portion 5g.

Upon detecting that a predetermined image quality management start operation was performed on the operation device 3a, the main control portion 5a starts the image quality management process.

[Image Quality Management Process]

Figure 2:
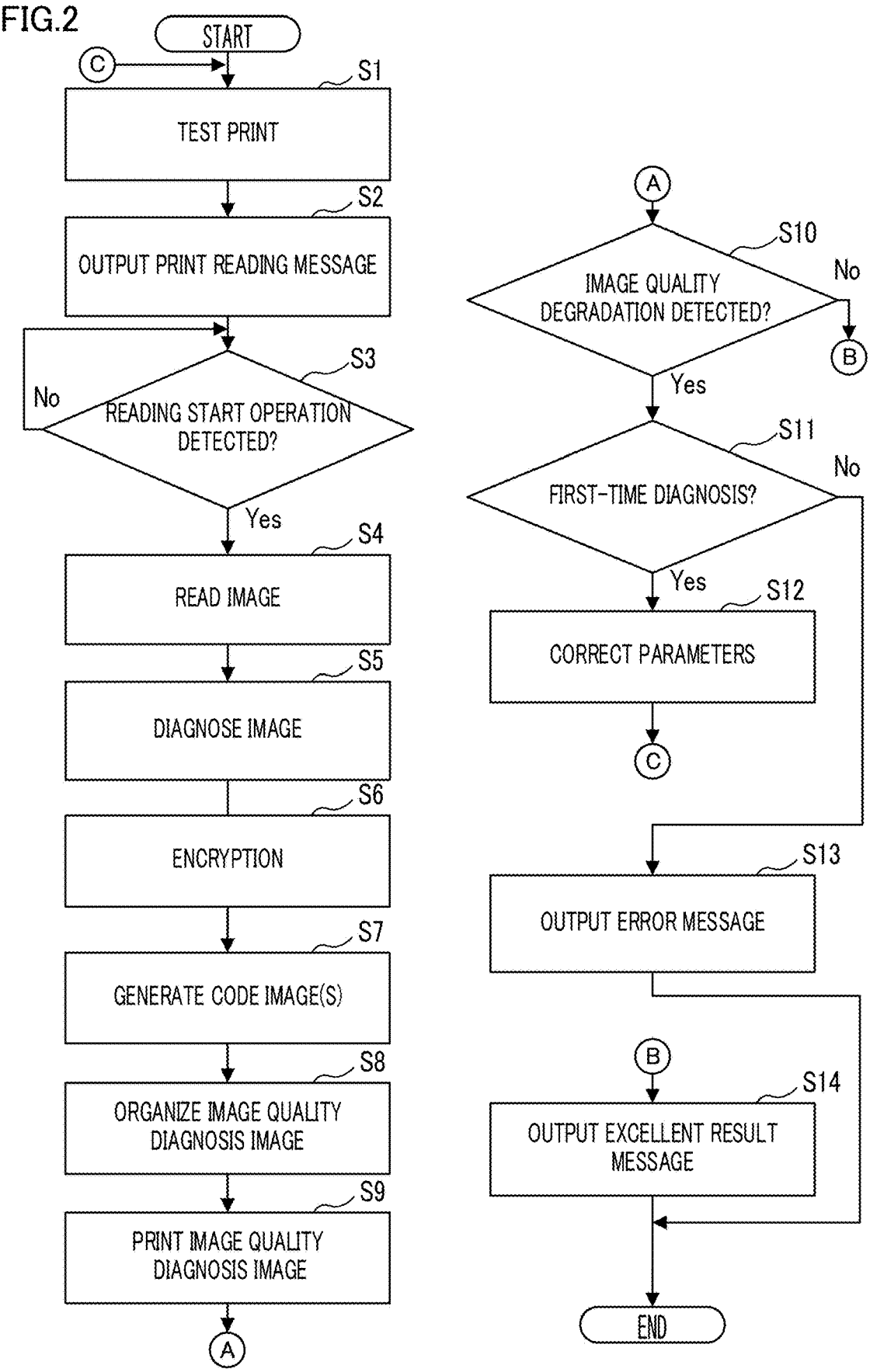
FIG. 2 is a flowchart showing an example of the procedure of an image quality management process executed in the image forming apparatus according to the embodiment.

The following describes an example of the image quality management process with reference to the flowchart shown in FIG. 2. In the following description, S1, S2, are identification signs representing a plurality of steps of the image quality management process.

<Step S1>

In the image quality management process, first the print control portion 5b executes the process of step S1, and moves the process to step S2.

Figure 3:
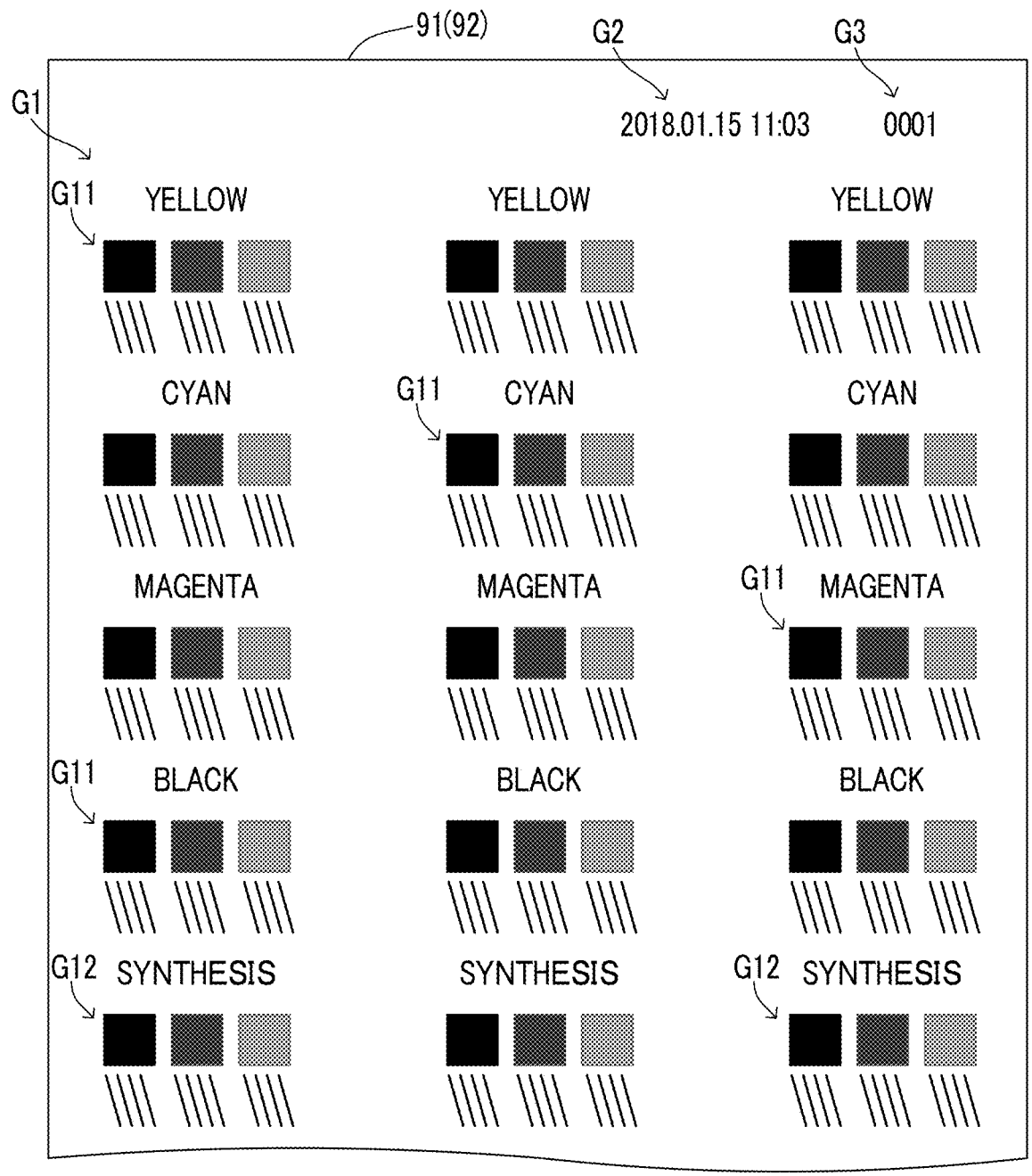
FIG. 3 is a diagram showing an example of a test image output by the image forming apparatus according to the embodiment.

In step S1, the print control portion 5b causes, via the print engine 50, the print device 1 to execute a test print process to form a predetermined test image G1 on the sheet 91 (see FIG. 3).

Referring to an example shown in FIG. 3, the test image G1 is an image used to diagnose quality of a print image. In the example shown in FIG. 3, the test image G1 includes a plurality of single-color test images G11 used to diagnose image quality with respect to developer fog and image density, for each color of the toner. Each of the single-color test images G11 is an image of toner of a single color.

Furthermore, the test image G1 shown in FIG. 3 further includes one or more synthesized color test images G12 used to diagnose a state of color drift of a color image synthesized from toner images of a plurality of colors.

In addition, in the test image G1 shown in FIG. 3, a plurality of single-color test images G11 of a same color and a plurality of synthesized color test images G12 are arranged in different regions of an output image.

Furthermore, in step S1, the print control portion 5b further causes the print device 1 to form a first date/time image G2 and a first identification image G3 on the sheet 91 during the test print process. The first date/time image G2 represents the date and time on which the test print process is executed. The first identification image G3 represents identification information of the test print process.

It is noted that the print control portion 5b executing the process of step S1 is an example of a test print control portion that causes the print device 1 to execute the test print process to form a predetermined test image G1 on the sheet 91.

<Step S2>

In step S2, the main control portion 5a causes the display device 3b to output a predetermined print reading message, and moves the process to step S3.

The print reading message is a message that urges the user to set a print that was obtained in the test print process, on the image reading device 2, and perform a predetermined reading start operation on the operation device 3a. The reading start operation is performed to cause the image reading device 2 to start executing the image reading process.

The print that is obtained in the test print process is a sheet 91 with the test image G1 formed thereon. In addition, the print that is set on the image reading device 2 by the user in response to the process of step S2 is a document sheet 92 on which the test image G1 has been formed in the test print process.

<Step S3>

In step S3, the main control portion 5a waits until the reading start operation performed on the operation device 3a is detected, and after the reading start operation is detected, the main control portion 5a moves the process to step S4.

<Step S4>

In step S4, the reading control portion 5c causes the image reading device 2 to execute the image reading process, and moves the process to step S5. This allows the image reading device 2 to read the test image G1 from the document sheet 92.

<Step S5>

In step S5, the image quality diagnosis portion 5d executes an image quality diagnosis process to diagnose image quality of the test image G1 included in the read image obtained by the image reading device 2 in step S4, and moves the process to step S6.

For example, the image quality diagnosis portion 5d determines, for each color of toner, whether or not an image quality degradation of insufficient density or excessive density has occurred by comparing an average density of a plurality of pixels in the single-color test images G11 with a predetermined target density range.

Furthermore, the image quality diagnosis portion 5d determines, for each color of toner, whether or not an image quality degradation of uneven density has occurred by comparing variation in density of the plurality of pixels in the single-color test images G11 with a predetermined allowable variation range.

Furthermore, the image quality diagnosis portion 5d determines whether or not an image quality degradation of color drift has occurred by comparing a pixel position for each color of toner in the synthesized color test images G12 with a predetermined target position range.

Furthermore, the image quality diagnosis portion 5d identifies a position where the image quality degradation has occurred, by determining at which of the plurality of single-color test images G11 of each color of toner and the plurality of synthesized color test images G12, the image quality degradation has occurred.

<Step S6>

In step S6, the encryption portion 5e encrypts, by a predetermined method, information of the one or more print parameters adopted in the test print process, and moves the process to step S7.

For example, the print parameters include control parameters for controlling: a charging voltage supplied to the charging device 1c; output timing of a laser beam in the laser scanning unit 1d; a developing bias voltage supplied to the laser scanning unit 1d; and a transfer bias voltage supplied to the operation portion 11.

<Step S7>

Figure 4:
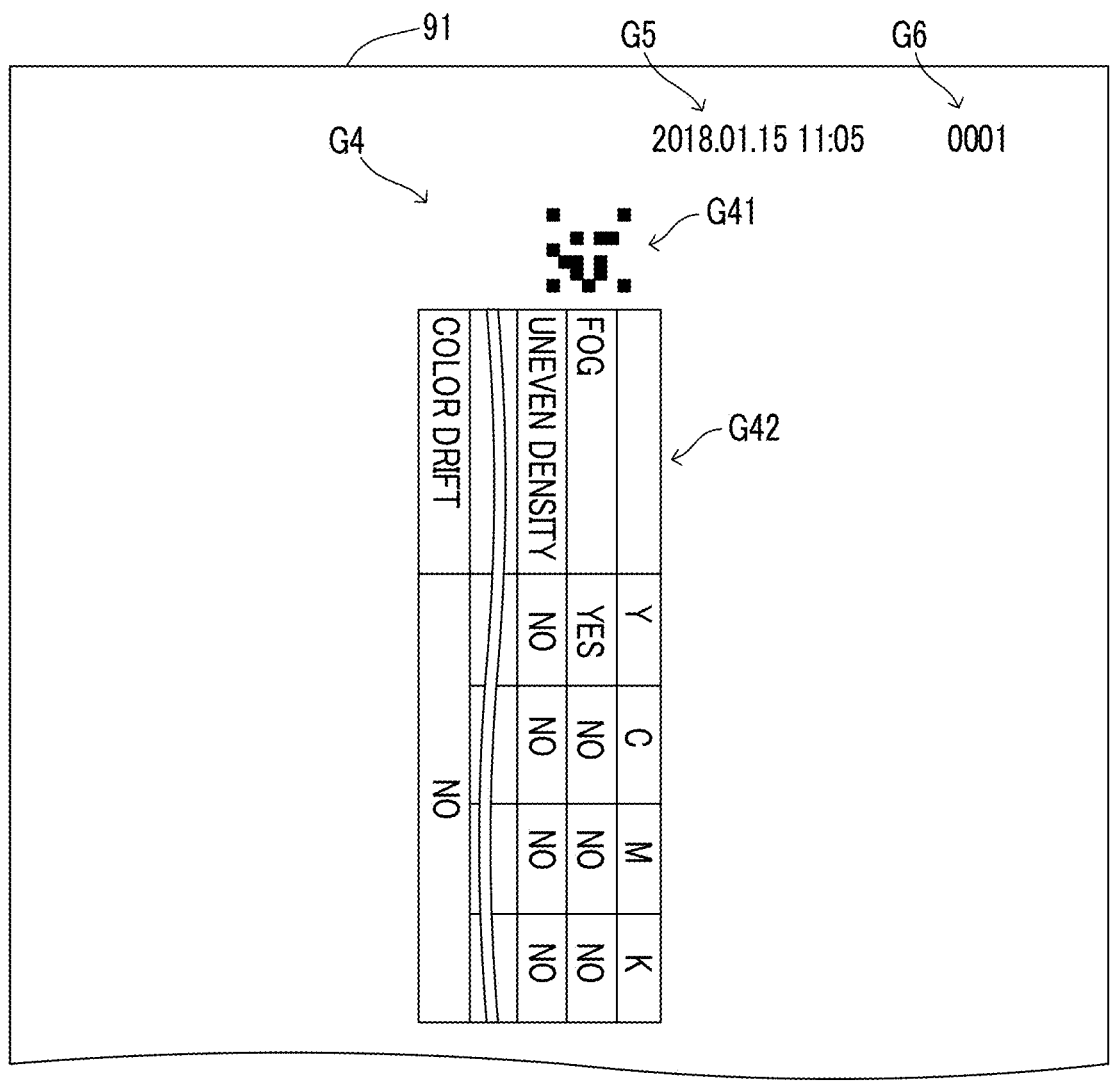
FIG. 4 is a diagram showing an example of a diagnosis image output by the image forming apparatus according to the embodiment.

In step S7, the code image generating portion 5f generates one or more code images G41 that represent information of the one or more print parameters adopted in the test print process (see FIG. 4). Thereafter, the code image generating portion 5f moves the process to step S8.

In the present embodiment, the code image generating portion 5f generates a code image G41 that represents information of the print parameters encrypted in step S6.

The code image G41 shown in FIG. 4 is an image of a two-dimensional code such as a QR code (registered trademark). It is noted that the code image G41 may be an image of a one-dimensional code such as a bar code.

<Step S8>

In step S8, the print control portion 5b executes a process to organize a diagnosis image G4 such as the one shown in FIG. 4, and then moves the process to step S9.

The diagnosis image G4 includes: a diagnosis result image G42 that indicates a diagnosis result of diagnosing image quality of the test image G1 obtained in step S5; and the code image G41 generated in step S7.

For example, as shown in FIG. 4, the diagnosis result image G42 is a character string image indicating the diagnosis result of image quality of the test image.

Furthermore, in step S8, the print control portion 5b organizes the diagnosis image G4 that includes, in addition to the code image G41 and the diagnosis result image G42, a second date/time image G5 and a second identification image G6. The second date/time image G5 indicates the date and time on which the diagnosis image G4 is output in the next step, namely step S9.

The second identification image G6 represents identification information of the test print process in which the print parameters represented by the code image G41 were adopted. That is, the second identification image G6 represents the same information as the first identification image G3 formed on the sheet 91 in step S1.

By consulting the first identification image G3 formed on the sheet 91 in the test print process and the second identification image G6 formed on the sheet 91 in the next step, step S9, it is possible to confirm the correspondence relations among the test image G1, the code image G41, and the diagnosis result image G42.

<Step S9>

In step S9, the print control portion 5b, via the print engine 50, causes the print device 1 to execute a process to form the diagnosis image G4 on the sheet 91 (see FIG. 4). Thereafter, the print control portion 5b moves the process to step S10.

In the above-described step S5, there may be a case where the image quality diagnosis portion 5d detects an image quality degradation only in a specific region of the test image G1 in the single-color test images G11 or the synthesized color test images G12, and does not detect an image quality degradation in the other regions.

In the above-described case, the print control portion 5b causes the print device 1 to execute a process to form the diagnosis image G4 in a region of the print region of the sheet 91 that is different from the region in which the image quality degradation was detected. This makes it possible to avoid that the diagnosis image G4 is output in a state of having the image quality degradation.

It is noted that when it is not the case that an image quality degradation is detected only in a specific region, the job control portion 5b causes the print device 1 to execute a process to form the diagnosis image G4 in a predetermined region of the sheet 91.

In addition, in the step S5, the image quality diagnosis portion 5d may detect an image quality degradation with respect to a specific color among a plurality of developing colors in the test image G1. In the present embodiment, the developing colors are colors of the toner.

In the above-described case, the print control portion 5b causes the print device 1 to execute a process to form the diagnosis image G4 in a color that is different from a color among the plurality of developing colors for which the image quality degradation was detected. This makes it possible to avoid that the diagnosis image G4 is output in a state of having the image quality degradation.

In addition, in the step S5, the image quality diagnosis portion 5d may detect an image quality degradation of developer fog in the test image G1. The developer fog is a phenomenon in which pixels that should not be developed are developed.

In the above-described case, the print control portion 5b causes the print device 1 to execute a process to form the diagnosis image G4 in a larger size with a lower resolution than in a case where an image quality degradation of developer fog is not detected.

In the case where the developer fog has occurred, if the code image G41 is formed in a small size with a high resolution, a reading error is apt to occur easily when the code image G41 is read through a camera or the like.

Forming the code image G41 in a large size with a low resolution makes it difficult for the reading error to occur. However, in this case, the diagnosis image G4 may not fit in one sheet 91, and it may be required to form the diagnosis image G4 divided into a plurality of sheets 91.

As described above, the print control portion 5b causes the print device 1 to execute a process to form the diagnosis image G4 on the sheet 91 in different output mode depending on the image quality degradation detected in the diagnosis of image quality of the test image G1.

The print device 1 that forms the diagnosis image G4 on the sheet 91 in step S9 is an example of an output device that outputs the diagnosis image G4. In addition, the print control portion 5b that executes the process of step S9 is an example of an output control portion that causes the print device 1 to output the diagnosis image G4.

<Step S10>

In step S10, the image quality diagnosis portion 5d selects the process to be executed next depending on the result of the image quality diagnosis process executed in step S5. That is, when an image quality degradation has been detected in the image quality diagnosis process, the image quality diagnosis portion 5d moves the process to step S11, and when an image quality degradation has not been detected, the image quality diagnosis portion 5d moves the process to step S14.

<Step S11>

In step S11, the image quality diagnosis portion 5d determines whether or not the latest diagnosis result that an image quality degradation was detected, is a result of the first-time image quality degradation diagnosis in the current image quality management process.

Upon determining that the latest diagnosis result that an image quality degradation was detected, is a result of the first-time image quality degradation diagnosis, the image quality diagnosis portion 5d moves the process to step S12, and otherwise, moves the process to step S13.

<Step S12>

In step S12, the parameter correcting portion 5g automatically executes a parameter correction process to correct a print parameter based on the diagnosis result of image quality of the test image G1, and moves the process to step S1. The process of step S12 is executed when an image quality degradation has been detected in the diagnosis of image quality of the test image G1.

For example, in a case where an image quality degradation of uneven density has been detected, the parameter correcting portion 5g corrects a parameter for controlling the amplitude or the frequency of the AM component of the charging voltage supplied to the charging device 1c so that the amplitude or the frequency increases.

In addition, in a case where an image quality degradation of color drift has been detected, the parameter correcting portion 5g corrects a parameter for controlling the output timing of the laser light in the laser scanning unit 1d.

It is noted that with regard to an image quality degradation that is detected for each color of toner, the parameter correcting portion 5g corrects a print parameter for each color of toner.

After the process of step S12 is executed, the test print process adopting the corrected print parameter is executed in step S1, and the processes of steps S2 to S10 are executed again in correspondence with the text print process adopting the corrected print parameter.

Accordingly, in a case where the process of step S12 is executed, the code image generating portion 5f executes the process of step S7 twice. Thus the code image generating portion 5f generates the code image G41 for each of: information of the print parameters before correction that corresponds to the diagnosis result of image quality of the test image G1; and information of the print parameters after correction.

<Step S13>

In step S13, the main control portion 5a executes a process to output a predetermined error message to the display device 3b, and ends the image quality management process.

For example, the error message urges the user to keep the print of the test image G1 obtained during the process of step S1 and the print of the diagnosis image G4 obtained during the process of step S9, and contact a predetermined service center.

<Step S14>

In step S14, the main control portion 5a executes a process to output a predetermined excellent result message to the display device 3b, and ends the image quality management process.

For example, the excellent result message notifies that the result of the image quality diagnosis process was excellent.

As described above, the image forming apparatus 10 diagnoses image quality of the test image G1 that is an example of the print image, and causes the print device 1 to output the diagnosis result together with the code image G41 that represents the information of the print parameters adopted in the print process of the test image G1.

Accordingly, even in a case where the image forming apparatus 10 is not connected to an open communication network, the test image G1 and information of the print parameters corresponding to the test image G1 are output so as to be conveyed to a specific worker such as a repair person.

In addition, since the information of the print parameters is output as the code image G41, disclosure of confidential information to users is avoided.

In addition, even in a case where the code image G41 is a general-purpose code such as the QR code (registered trademark), since the code image G41 that represents information of encrypted print parameters is generated, disclosure of confidential information to users is avoided.

On the other hand, workers such as repair persons can confirm the information of the print parameters by using a terminal apparatus that converts the code image G41 into character string information.

For example, the terminal apparatus includes: a camera that photographs the code image G41; and an image processing apparatus that processes the code image G41 photographed by the camera. The image processing apparatus includes a code restoring portion and a decryption portion, wherein the code restoring portion restores the code image G41 to character string information, and the decryption portion decrypts the character string information to information before encryption.

It is noted that the process of step S6 for encrypting the information of the print parameters may be omitted. In this case, too, with only seeing the diagnosis image G4, the user cannot recognize the information of the print parameters.

First Application Example

The following describes a first application example of the image forming apparatus 10.

In the present application example, in the process of step S9 shown in FIG. 2, the main control portion 5a outputs the diagnosis image G4 to the display device 3b. In this case, the display device 3b is an example of an output device that outputs an image. Furthermore, the main control portion 5a is an example of an output control portion that causes the output device thereof to output the diagnosis image G4.

Second Application Example

The following describes a second application example of the image forming apparatus 10.

In the present application example, the image forming apparatus 10 does not include the parameter correcting portion 5g. That is, in the image quality management process shown in FIG. 2, the processes of steps S11 and S12 are omitted.

In the present application example, when an image quality degradation is detected, the process moves from step S10 to step S13. In this case, the image forming apparatus 10 does not execute the parameter correction process automatically, but a specific worker such as the repair person adjusts the print parameters by consulting the test image G1 and the diagnosis image G4.

Third Application Example

The following describes a third application example of the image forming apparatus 10.

In the above-described embodiment, the diagnosis result image G42 is a character string image indicating a diagnosis result of image quality of the test image G1 (see FIG. 4).

The code image generating portion 5f of the present application example generates, in step S7 of FIG. 2, the code image G41 that represents: character string information representing the diagnosis result of image quality of the test image G1; and encrypted information of the print parameters.

In addition, in step S9 of FIG. 2, the print control portion 5b causes the print device 1 to output, as the code image G41, an image representing the diagnosis result of image quality of the test image G1. This prevents users from easily recognizing information of the diagnosis result of image quality of the test image G1. In addition, this makes it possible to efficiently record more information in a limited print region of the sheet 91.

Fourth Application Example

The following describes a fourth application example of the image forming apparatus 10.

The code image generating portion 5f of the present application example generates, in step S7 of FIG. 2, the code image G41 only for, among information of a plurality of print parameters adopted in the test print process, partial information corresponding to an image quality degradation detected in the diagnosis of image quality of the test image G1. The correspondence relation between the information of the print parameters and the image quality degradation is preliminarily determined.

According to the present application example, in a case where the amount of information of the print parameters is so large that a plurality of code images G41 are required, it is possible to reduce the generated number of code images G41.

The invention claimed is:

1. An image forming apparatus comprising:
a print device configured to form an image on a sheet;
an image reading device configured to read an image from a document sheet;
a test print control portion configured to cause the print device to execute a test print process to form a predetermined test image on a sheet;
an image quality diagnosis portion configured to diagnose image quality of the test image included in the image read by the image reading device;
a code image generating portion configured to generate a code image that represents information of print parameters adopted in the test print process; and
an output control portion configured to cause an output device to output a diagnosis image that includes an image representing a diagnosis result of image quality of the test image, and the code image, wherein
the output device is the print device, and
the output control portion causes the print device to execute a process to form the diagnosis image on the sheet in different output mode depending on the image quality degradation detected in the diagnosis of image quality of the test image.

2. The image forming apparatus according to claim 1, wherein
when the image quality diagnosis portion detects an image quality degradation in an image in a specific region of the test image, the output control portion causes the print device to execute a process to form the diagnosis image in a region of the print region of the sheet that is different from the region in which the image quality degradation was detected.

3. The image forming apparatus according to claim 1, wherein
when the image quality diagnosis portion detects an image quality degradation with respect to a specific color among a plurality of developing colors in the test image, the output control portion causes the print device to execute a process to form the diagnosis image in a color that is different from a color among the plurality of developing colors for which the image quality degradation was detected.

4. The image forming apparatus according to claim 1, wherein
when the image quality diagnosis portion detects an image quality degradation of developer fog in the test image, the output control portion causes the print device to execute a process to form the diagnosis image in a larger size with a lower resolution than in a case where an image quality degradation of developer fog is not detected.

5. An image forming apparatus comprising:
a print device configured to form an image on a sheet;
an image reading device configured to read an image from a document sheet;
a test print control portion configured to cause the print device to execute a test print process to form a predetermined test image on a sheet;
an image quality diagnosis portion configured to diagnose image quality of the test image included in the image read by the image reading device;
a code image generating portion configured to generate a code image that represents information of print parameters adopted in the test print process;
an output control portion configured to cause an output device to output a diagnosis image that includes an image representing a diagnosis result of image quality of the test image, and the code image; and
a parameter correcting portion configured to, when an image quality degradation has been detected in the diagnosis of image quality of the test image, correct a print parameter corresponding to the image quality degradation, wherein
the code image generating portion generates the code image for each of: information of the print parameters before correction that corresponds to the diagnosis result of image quality of the test image; and information of the print parameters after correction.

6. An image forming apparatus comprising:
a print device configured to form an image on a sheet;
an image reading device configured to read an image from a document sheet;
a test print control portion configured to cause the print device to execute a test print process to form a predetermined test image on a sheet;
an image quality diagnosis portion configured to diagnose image quality of the test image included in the image read by the image reading device;
a code image generating portion configured to generate a code image that represents information of print parameters adopted in the test print process;
an output control portion configured to cause an output device to output a diagnosis image that includes an image representing a diagnosis result of image quality of the test image, and the code image; and an encryption portion configured to encrypt information of the print parameters adopted in the test print process, wherein the code image generating portion generates a code image that represents: character string information representing the diagnosis result of image quality of the test image; and the encrypted information of the print parameters, and the output control portion causes the output device to output, as the code image, an image representing the diagnosis result of image quality of the test image.

7. An image forming apparatus comprising:

a print device configured to form an image on a sheet;

an image reading device configured to read an image from a document sheet;

a test print control portion configured to cause the print device to execute a test print process to form a predetermined test image on a sheet;

an image quality diagnosis portion configured to diagnose image quality of the test image included in the image read by the image reading device;

a code image generating portion configured to generate a code image that represents information of print parameters adopted in the test print process; and an output control portion configured to cause an output device to output a diagnosis image that includes an image representing a diagnosis result of image quality of the test image, and the code image, wherein the code image generating portion generates the code image only for, among information of a plurality of print parameters adopted in the test print process, partial information corresponding to an image quality degradation detected in the diagnosis of image quality of the test image.

* * * * *